(12) United States Patent
Corey

(10) Patent No.: US 10,934,026 B2
(45) Date of Patent: Mar. 2, 2021

(54) PROPULSION SYSTEM WITH DIFFERENTIAL THROTTLING OF ELECTRIC THRUSTERS

(71) Applicant: Aerojet Rocketdyne, Inc., Sacramento, CA (US)

(72) Inventor: Ronald Corey, Redmond, WA (US)

(73) Assignee: Aerojet Rocketdyne, Inc., Redmond, WA (US)

( * ) Notice: Subject to any disclaimer, the term of this patent is extended or adjusted under 35 U.S.C. 154(b) by 387 days.

(21) Appl. No.: 15/762,176

(22) PCT Filed: Oct. 19, 2015

(86) PCT No.: PCT/US2015/056174
§ 371 (c)(1),
(2) Date: Mar. 22, 2018

(87) PCT Pub. No.: WO2017/069728
PCT Pub. Date: Apr. 27, 2017

(65) Prior Publication Data
US 2018/0273213 A1    Sep. 27, 2018

(51) Int. Cl.
*B64G 1/40*    (2006.01)
*B64G 1/26*    (2006.01)
*F03H 1/00*    (2006.01)

(52) U.S. Cl.
CPC .............. *B64G 1/405* (2013.01); *B64G 1/26* (2013.01); *F03H 1/00* (2013.01)

(58) Field of Classification Search
CPC .......... B64G 1/405; B64G 1/26; B64G 1/244; B64G 1/242; F03H 1/00; F03H 1/037
See application file for complete search history.

(56) References Cited

U.S. PATENT DOCUMENTS

| | | | | |
|---|---|---|---|---|
| 5,130,931 A | * | 7/1992 | Paluszek | B64G 1/244 701/13 |
| 5,349,532 A | * | 9/1994 | Tilley | B64G 1/26 244/164 |
| 5,813,633 A | * | 9/1998 | Anzel | B64G 1/26 244/169 |
| 6,032,904 A | | 3/2000 | Hosick et al. | |
| 6,208,080 B1 | | 5/2001 | King et al. | |
| 6,296,207 B1 | | 10/2001 | Tilley et al. | |

(Continued)

FOREIGN PATENT DOCUMENTS

EP    0568209    11/1993

OTHER PUBLICATIONS

International Preliminary Report on Patentability for International Patent Application No. PCT/US2015/056174, dated May 3, 2018.

(Continued)

*Primary Examiner* — Medhat Badawi
*Assistant Examiner* — Vicente Rodriguez

(57) ABSTRACT

A propulsion system includes at least one group of electric thrusters that are spatially distributed in a multi-axis system. A controller is in communication with each of the electric thrusters. The controller is configured to differentially throttle the thrusts of the electric thrusters with respect to propulsion force about two axes of the multi-axis system.

13 Claims, 2 Drawing Sheets

(56) References Cited

U.S. PATENT DOCUMENTS

| | | | |
|---|---|---|---|
| 6,445,981 B1* | 9/2002 | Higham | B64G 1/26 |
| | | | 701/13 |
| 6,481,672 B1 | 11/2002 | Goodzeit et al. | |
| 6,637,701 B1 | 10/2003 | Glogowski et al. | |
| 7,579,780 B2 | 8/2009 | Tamida et al. | |
| 8,019,439 B2 | 9/2011 | Kuzma et al. | |
| 2015/0239582 A1* | 8/2015 | Claggett | F02D 41/221 |
| | | | 701/13 |
| 2016/0046395 A1* | 2/2016 | Mansour | B64G 1/26 |
| | | | 701/13 |
| 2016/0376035 A1* | 12/2016 | Ho | B64G 1/26 |
| | | | 244/158.8 |

OTHER PUBLICATIONS

Temkin, S.E. (2010). THESIS: Performance characterization of a three-axis hall effect thruster. Air Forice Institue of Technology. Dec. 2010. pp. 1-146.

Randolph, T., and Oleson, S.R. (2005). The Prometheus 1 spacecraft preliminary electric propulsion system design. 41st AIAA/ASME/SAE/ASEE Joint Propulsion Conference & Exhibit. Jul. 2005. pp. 1-10.

International Search Report and Written Opinion for PCT Application No. PCT/US2015/056174, dated Aug. 30, 2016.

\* cited by examiner

# PROPULSION SYSTEM WITH DIFFERENTIAL THROTTLING OF ELECTRIC THRUSTERS

BACKGROUND

There are numerous different types of spacecraft thrusters. For example, chemical rockets/thrusters utilize exothermic reactions to produce pressurized gas that is accelerated through a nozzle. In contrast, electric propulsion uses electromagnetic forces to generate thrust. A category of electric propulsion devices that is currently in general use is the electrostatic thruster. There are two key types of electrostatic thrusters, including the electric thruster (either radio frequency electric thrusters or Kaufmann type electric thrusters) and the "Hall effect thruster," or "HET" (either magnetic layer or anode layer type). In addition to the electrostatic types of thruster there are Electrothermal and Electromagnetic types. All types of electric propulsion listed may be characterized by low thrust and high efficiency compared to chemical thrusters. The high efficiency means low on-board propellant requirements compared to an equivalent spacecraft that utilizes a chemical thruster but at the cost of lower thrust, which means longer and more frequent maneuvers. In practice an electric thruster can be used for a variety of purposes, including attitude control, station-keeping, in which thrust counteracts natural spacecraft drift due to solar pressure, gravity of the sun and moon, and the Earth's non-homogeneity, and orbit raising in which the thruster is used to insert the spacecraft into its final orbital position after separation from the launch vehicle.

SUMMARY

A propulsion system for a spacecraft according to an example of the present disclosure includes at least one group of electric thrusters spatially distributed in a multi-axis system and a controller in communication with each of the electric thrusters. The controller is configured to differentially throttle the thrusts of the electric thrusters with respect to propulsion force about two axes of the multi-axis system.

In a further embodiment of any of the forgoing embodiments, the controller is configured to differentially throttle the thrusts with respect to unloading accumulated angular momentum of momentum wheels about the two axes of the multi-axis system.

In a further embodiment of any of the forgoing embodiments, two or more of the electric thrusters are oriented in different directions.

In a further embodiment of any of the forgoing embodiments, the different directions are complimentary directions.

In a further embodiment of any of the forgoing embodiments, with respect to the multi-axis system, each of the electric thrusters is oriented at approximately 45°, or positive or negative multiples thereof, to each of three orthogonal axes.

In a further embodiment of any of the forgoing embodiments, the at least one group includes a first group of at least four electric thrusters and a second group of at least two electric thrusters, and the controller is configured to differentially throttle the thrusts of the first group with respect to the two axes of the multi-axis system and differentially throttle the thrusts of the second group with respect to a third axis of the multi-axis system.

In a further embodiment of any of the forgoing embodiments, the at least one group includes a first group of four electric thrusters and a second group of four electric thrusters, and the first group is symmetrically arranged with respect to the second group.

In a further embodiment of any of the forgoing embodiments, the at least one group of electric thrusters includes a first group of electric thrusters and a second group of electric thrusters, and the controller includes a primary mode of operation in which the controller is configured to differentially throttle the thrusts of the first group in response to a first ascension angle and differentially throttle the thrusts of the second group for a predetermined time period in response to a second, different ascension angle.

In a further embodiment of any of the forgoing embodiments, the controller includes a redundancy mode of operation triggered in response to an inoperability of at least one of the electric thrusters in the first group, and in the redundancy mode the controller is configured to exclude the differential throttle of the thrusts of the first group and to include the differential throttle of the thrusts of the second group in response to the second ascension angle but for a time greater than the predetermined time period.

In a further embodiment of any of the forgoing embodiments, the controller includes a redundancy mode of operation triggered in response to an inoperability of at least one of the electric thrusters in the first group, and in the redundancy mode the controller is configured to differentially throttle a complimentary pair of the electric thrusters of the first group.

In a further embodiment of any of the forgoing embodiments, the propulsion system is gimbal-less.

In a further embodiment of any of the forgoing embodiments, the controller is configured to differentially throttle the thrusts in unison.

A process for controlling a spacecraft according to an example of the present disclosure includes providing four electric thrusters spatially distributed in a two-axis system, generating thrust from all of the four electric thrusters, and differentially throttling one of the four electric thrusters while generating thrust from all of the four electric thrusters.

A further embodiment of any of the foregoing embodiments includes differentially throttling a second one of the four electric thrusters while differentially throttling the one of the four electric thrusters.

A further embodiment of any of the foregoing embodiments includes differentially throttling a third one and a fourth one of the four electric thrusters after differentially throttling the first one and the second one of the four electric thrusters.

A further embodiment of any of the foregoing embodiments includes differentially throttling a third one of the four electric thrusters both after throttling the second one of the four electric thrusters and while throttling the first one of the electric thrusters.

In a further embodiment of any of the forgoing embodiments, the generating thrust provides an attitude control and a station keeping control.

A method for a propulsion system according to an example of the present disclosure includes for at least one group of electric thrusters spatially distributed in a multi-axis system, differentially throttling the thrusts provided by the electric thrusters with respect to propulsion force about two axes of the multi-axis system.

A further embodiment of any of the foregoing embodiments includes differentially throttling the thrusts with respect to unloading accumulated angular momentum of momentum wheels about the two axes of the multi-axis system.

In a further embodiment of any of the forgoing embodiments, the at least one group includes a first group of at least four electric thrusters and a second group of at least two electric thrusters, and includes differentially throttling the thrusts of the first group with respect to the two axes of the multi-axis system and differentially throttling the thrusts of the second group with respect to a third axis of the multi-axis system.

In a further embodiment of any of the forgoing embodiments, the at least one group includes a first group of electric thrusters and a second group of electric thrusters, and, in a primary mode of operation, differentially throttling the thrusts of the first group in response to a first ascension angle and differentially throttling the thrusts of the second group for a predetermined time period in response to a second, different ascension angle.

A further embodiment of any of the foregoing embodiments includes a redundancy mode of operation that triggers in response to an inoperability of at least one of the electric thrusters in the first group, and the redundancy mode excludes the differential throttling of the thrusts of the first group and includes differentially throttling the thrusts of the second group in response to the second ascension angle but for a time greater than the predetermined time period.

A further embodiment of any of the foregoing embodiments includes a redundancy mode of operation that triggers in response to an inoperability of at least one of the electric thrusters in the first group, and the redundancy mode includes differentially throttling a complimentary pair of the electric thrusters of the first group.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
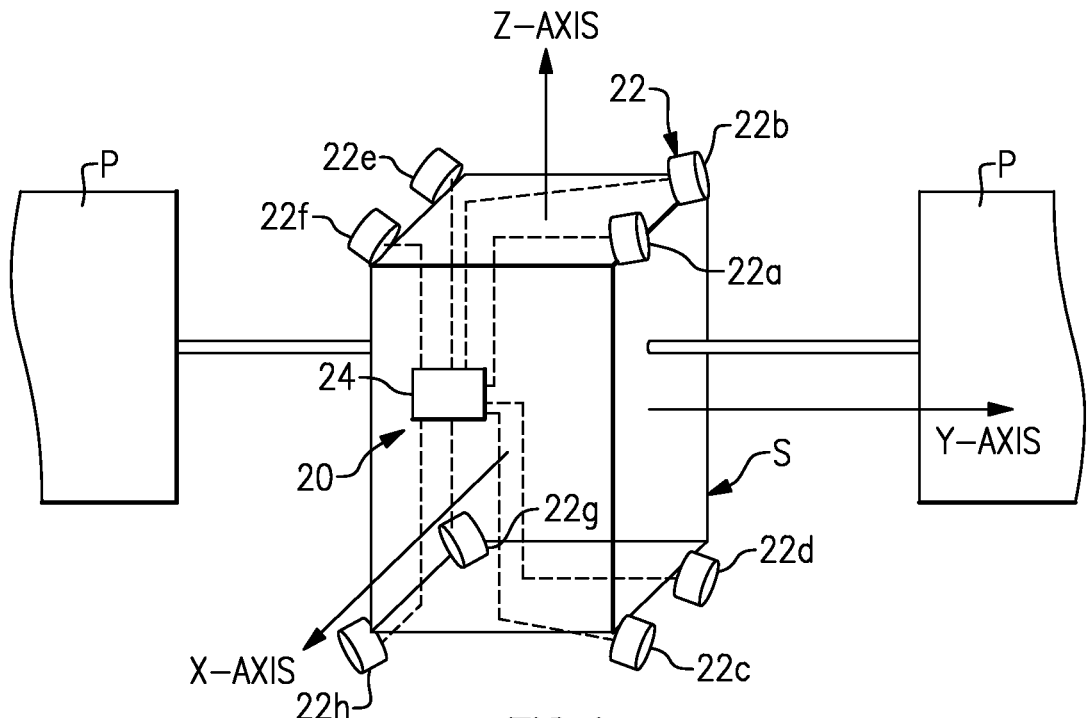
FIG. 1 illustrates an example propulsion system that includes electric thrusters and a controller that differentially throttles the thrusters.

FIG. 1 illustrates a propulsion system 20. The propulsion system 20 is shown and described in context of its potential use with a spacecraft, S. For example, the spacecraft S is a geostationary spacecraft that has potential use in medium or high Earth orbits. Although shown with the spacecraft, it is to be understood that the propulsion system 20 can be provided as a separate system for later integration with the spacecraft, for example.

The propulsion system 20 includes at least one group of electric thrusters, such as Hall effect thrusters. The electric thrusters are generally represented at 22 and are individually represented at 22a-h. In this example, the propulsion system 20 includes two groups of the electric thrusters 22. For example, a "group" of electric thrusters 22 is two or more electric thrusters 22 that are cooperatively related by a control scheme/methodology with respect to one or more functional thrust objectives. The control scheme/methodology may include simultaneous or overlapping firing of two or more of the electric thrusters 22 of a group. In the illustrated example, a first group includes electric thrusters 22a-d, and a second group includes electric thrusters 22e-h. As will be appreciated, this disclosure is not limited to the numbers or locations of the electric thrusters 22 in the examples herein, and the disclosure is also applicable to other thruster locations and numbers.

The electric thrusters 22 are spatially distributed in a multi-axis system. In this example, the multi-axis system is a three-axis Cartesian system that includes orthogonal X, Y, and Z axes. The electric thrusters 22 may be spatially distributed with respect to the origin of the X, Y, and Z axes. The origin may represent, or correspond to, a physical characteristic of the spacecraft S, such as but not limited to, the location of momentum wheels and/or the approximate center of gravity of the spacecraft S.

Each of the electric thrusters 22 is in communication with a controller 24. The controller 24 includes hardware, software, or both for carrying out the operations described herein with respect to control of the electric thrusters 22. In this regard, the hardware can include, but is not limited to, microprocessors, power processing units, voltage regulators, current regulators, bus bars, and the like. Software may be programmed/configured to selectively send and receive signals among the hardware and the electric thrusters 22 to control operation thereof. In this respect, although the controller 24 is depicted as a single unit, it is to be understood that the hardware and software may be distributed among a plurality of separate control devices or modules, which may or may not be in the same location.

The controller 24 is configured to differentially throttle the thrusts of the electric thrusters 22 with respect to propulsion force about two axes of the multi-axis system. The phrases "differentially throttle" and variations thereof refer to the regulation of propulsion forces to output different propulsion forces from two or more electric thrusters 22. For example, the controller 24 differentially throttles two or more of the electric thrusters 22 to urge rotation of the spacecraft S about two axes of the X, Y, and Z axes.

The controller 24 can differentially throttle the thrusts of the electric thrusters 22 by regulating one or more inputs of each of the electric thrusters 22. For example, the input or inputs can be, but are not limited to, electric current and voltage. For instance, the controller 24 regulates electric current input of the electric thrusters 22. The amount of electric current provided corresponds to the amount of thrust produced. Thus, regulating to provide either more or less electric current produces, respectively, more or less thrust. In further examples, the controller 24 regulates the electric current in distinct increments, such as but not limited to, 0.1 ampere increments. The distinct increments can be selected in accordance with a desired level of control of the thrust, and can be used in combination with a feedback loop to an attitude control system to incrementally adjust the thrust in response to signal data that represents attitude position. For instance, the feedback loop can be similar to that used in a gimbaled system.

In the illustrated example, the first and second groups of electric thrusters 22 are symmetrically arranged with respect to the X-Z plane. For instance, each group is in essence spatially distributed in a two-dimensional plane and can thus also be represented in a two-axis system with respect to its plane. The controller 24 can differentially throttle the first group of electric thrusters 22a-d and differentially throttle the second group of thrusters 22e-h for attitude control of the spacecraft S. For example, the differential throttling is used to unload accumulated angular momentum of momentum wheels about two axes in the spacecraft S. The unloading may be used to reduce or avoid momentum wheel saturation. Because of the ability to generate propulsion force about two axes of the multi-axis system, a momentum unload about one axis, such as the Z-axis, can be performed in unison with an inclination control maneuver (about the Y-axis) or a longitude correction maneuver (about the X-axis). The term "unison" refers to the simultaneous or overlapping firing of two or more electric thrusters 22. To perform an orbital correction maneuver with a resultant thrust vector that would allow for the stored spacecraft momentum to be reduced at the same time. This may also eliminate the need for separate momentum unloading thruster firings, gimbals, and dedicated burns for momentum management, and all thruster firings can be coordinated to be performed at favorable orbital locations.

The ability to generate propulsion force about two axes of the multi-axis system may also be used to separate the total impulse requirement for on-station maneuvers and orbit raising maneuvers. Depending on a mission design, the requirements for station-keeping and orbit raising can be very different. Orbit raising may require high thrust for decreased maneuver time, and station-keeping may require high specific impulse (Isp) and high cycle life. By separating the total impulse requirement, the control scheme can potentially be simplified to the use of a single output voltage that is relatively high for the station-keeping thrusters and relatively low for orbit raising thrusters. Also, by separating the total impulse requirement there is potentially the option to use high impulse chemical thrusters for orbit raising while maintaining full electric station-keeping capability with the electric thrusters 22.

In a further example, the differential throttling is utilized for inclination control. For instance, the controller 24 makes inclination corrections twice a day using the first group of electric thrusters 22a-d at a right ascension of 90° and using the second group of electric thrusters 22e-h B at a right ascension of 270°.

In another example, the controller 24 differentially throttles the thrusts of the electric thrusters 22 in a process for attitude control and/or station-keeping control of the spacecraft. Attitude control maneuvers are used to change the direction that the spacecraft is facing (e.g., to ensure transponders point in a desired direction). Station-keeping maneuvers are used to maintain the spacecraft within a tight latitude/longitude position. Momentum wheels may typically perform attitude control maneuvers. However, the momentum wheels need additional energy for particular maneuvers. Differential throttling of the thrusters 22 can be utilized to provide that additional energy.

An example process for attitude control and/or station-keeping control can utilize either the first group of four electric thrusters 22a-d or the second group of four electric thrusters 22e-h. The process includes generating thrust from all four of the electric thrusters 22 of the group, and differentially throttling one of the four electric thrusters 22 (e.g., thruster 22a) of the group while generating thrust from the other three of the electric thrusters 22 of the group (thrusters 22b-d).

In a further example, the process additionally includes differentially throttling a second one of the four electric thrusters 22 of the group (i.e., one of thrusters 22b-d) while differentially throttling the first one of the four electric thrusters 22 of the group (thruster 22a).

In yet a further example, the process additionally includes differentially throttling a third one and a fourth one of the four electric thrusters 22 (e.g., two of thrusters 22b-d) after differentially throttling the first one and the second one of the four electric thrusters 22 of the group. In an additional example, the process also includes differentially throttling the third one of the four electric thrusters 22 after throttling the second one of the four electric thrusters 22 and while throttling the first one of the electric thrusters 22.

In a further example, the controller 24 can include a "redundancy" scheme to ensure continuing operation in the event that a single one of the electric thrusters 22 becomes inoperable. For example, the controller 24 is configured with a primary mode of operation and a redundancy mode of operation. In the primary mode of operation all of the electric thrusters 22 are operable (can provide thrust). The controller 24 differentially throttles the first group of electric thrusters 22a-d and differentially throttles the second group of thrusters 22e-h for the inclination corrections as described above. The inoperability of one of the electric thrusters 22 (no ability, or substantially reduced ability, to provide thrust) triggers a shift to the redundancy mode. For example, if the electric thruster 22a becomes inoperative, the controller 24 excludes the differential throttle of the first group of electric thrusters 22a-d and uses only the second group. In this case, the controller 24 differentially throttles the second group of electric thrusters 22e-h at the right ascension of 270° but for a time that is greater than that used in the primary mode. For instance, if in the primary mode the second group is differentially throttled for a predetermined time, t, the second group may be differentially throttled for a time of approximately 2 t in the redundancy mode to account for the exclusion of the operation of the first group. As will be further appreciated, the redundancy mode may be configured to account for which of the electric thrusters 22 is inoperable and to select the appropriate group to exclude.

In one alternative example of a redundancy mode, rather than exclude the differential throttling of one of the groups and relying only on another group, the controller 24 differentially throttles a complimentary set of electric thrusters 22. For instance, if electric thruster 22a becomes inoperable, the controller 24 differentially throttles the diagonal pair of electric thrusters 22b/22c of the first group to perform the inclination correction as in the primary mode. In this case, the diagonal pair of electric thrusters 22b/22c are complimentary such that the thrust in non-primary (off-axis) directions cancels.

The electric thrusters 22 are fixed on the spacecraft S in predetermined orientations with respect to the multi-axis system and, if needed, also with respect to the structure of the spacecraft S. In the example illustrated in FIG. 1, the electric thrusters 22 are each oriented in a unique direction. For example, the electric thrusters 22 are generally located at the corner regions of the spacecraft S and are angled away from the body of the spacecraft S and solar panels P, to avoid or reduce impingement of the thrust plume directly onto the body or solar panels P.

In a further example, each of the electric thrusters 22 is oriented at approximately 45°, or a +/− multiple thereof, to each of X, Y, and Z axes. Such an arrangement may facilitate reducing or eliminating the introduction of pitch torque and facilitate more efficient operation of the two electric thruster redundancy mode described above. That is, if the angles of the diagonal pair of electric thrusters 22b/22c are not complimentary such that the thrust in non-primary (off-axis) directions cancels, there may be losses that reduce specific impulse by an order of magnitude of two or more. The orientation of 45°, or multiple, would also permit dedicated radial burns.

Figure 2:
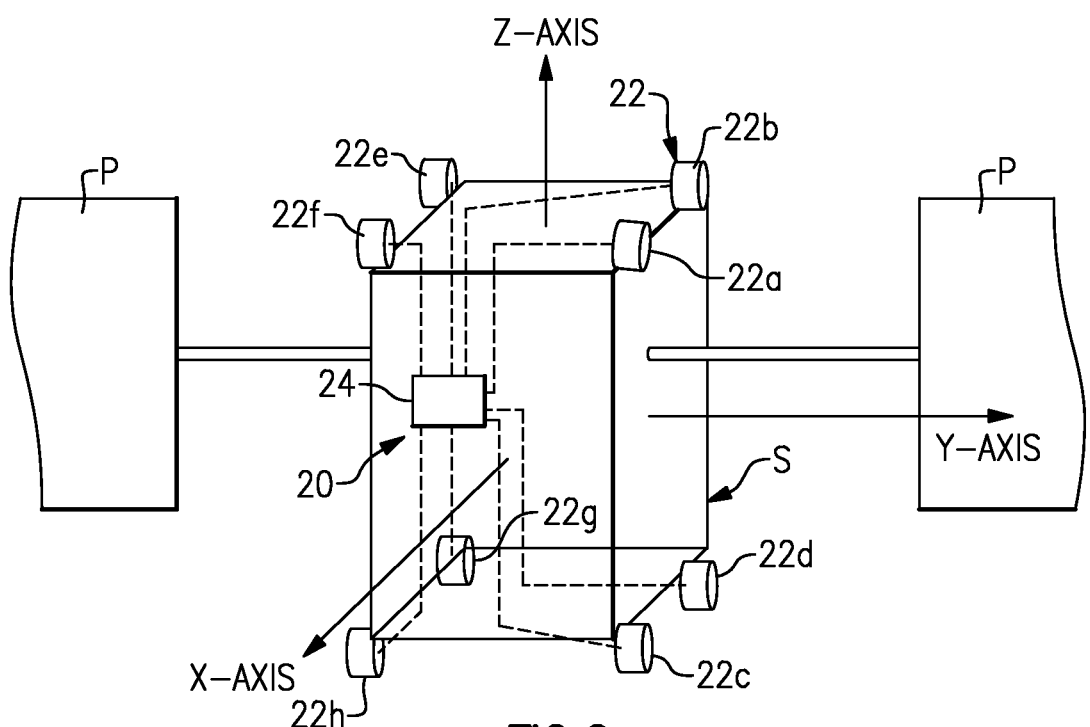
FIG. 2 illustrates a modified example in which the electric thrusters are oriented differently than in FIG. 1.

FIG. 2 illustrates a modified example in which, rather than the 45° orientation, the electric thrusters 22 are each oriented approximately parallel with the Y-axis. In this example, the electric thrusters 22a-22d are oriented in a +Y directions and the electric thrusters 22e-h are oriented in the opposite −Y direction.

Figure 3:
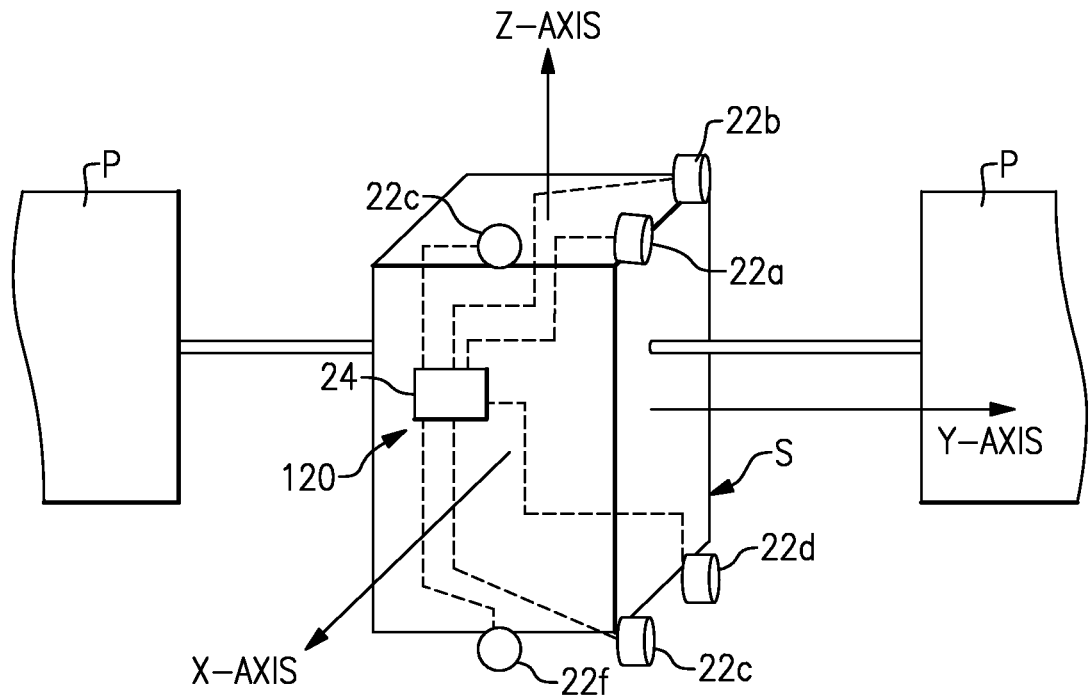
FIG. 3 illustrates another modified example that has fewer electric thrusters than in FIG. 1, and a portion of the electric thrusters are in different relative locations.

FIG. 3 illustrates another example propulsion system 120 that includes six electric thrusters 22. In this example, the first group again includes electric thrusters 22a-d, but the second group includes only electric thrusters 22e and 22f. Moreover, electric thrusters 22e and 22f are in different locations and generally face in the X-axis direction. The controller 24 operates the first group as described above in the primary mode. The controller 24 differentially throttles the second group for in-plane maneuvers and momentum unloading about the third axis that was not one of the unloaded axes of the first group. However, the illustrated arrangement does not offer a redundancy mode for single electric thruster inoperability, as with the eight electric thruster arrangement.

Figure 4:
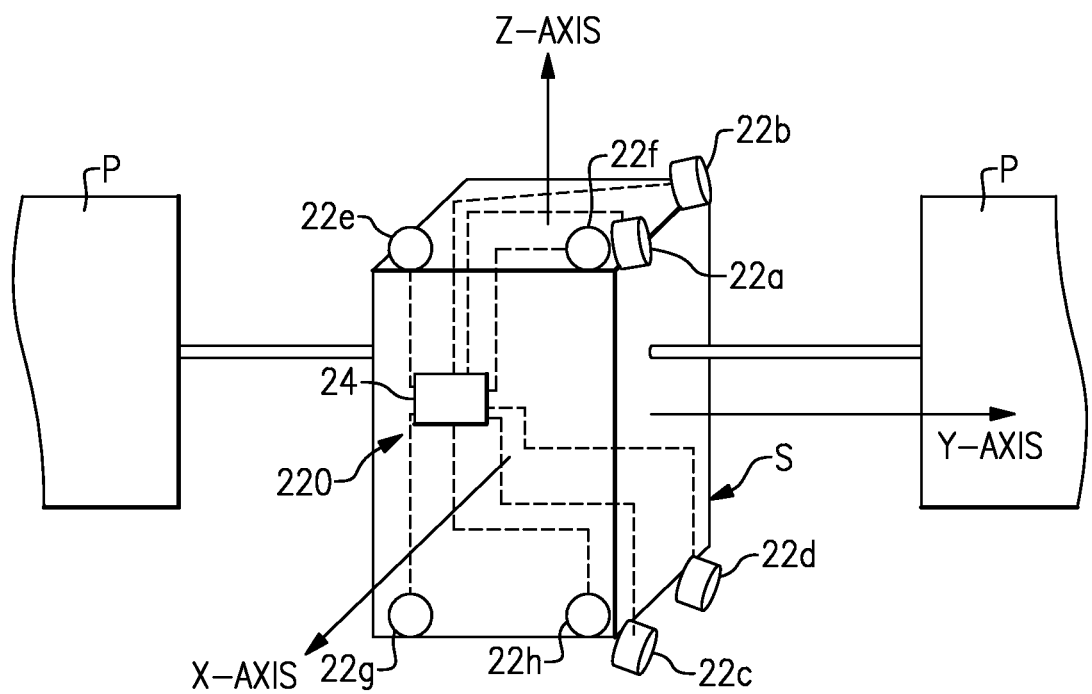
FIG. 4 illustrates another modified example that has more electric thrusters than in FIG. 3, and a portion of the electric thrusters are in different relative locations.

FIG. 4 illustrates another example propulsion system 220 that includes eight electric thrusters 22. In this example, the first group again includes electric thrusters 22a-d. The second group again includes electric thrusters 22e-h, but they are in different locations generally facing along the X-axis direction. In this case, the electric thrusters 22e-h are generally oriented to point away from the body of the spacecraft S, solar panels P and any payload, and the orientations are either equal or equal +/− multiples. For instance, the orientations may be symmetric with respect to the X-Z plane.

In a further example in the propulsion system 220, an angle of a 20° may have minimal impact on the body of the spacecraft S, solar panels P and payload, with enhanced maneuver efficiency. For instance, the maneuver efficiency may be greater than the configuration of FIG. 1. However, greater maneuver efficiency may debit or preclude station relocation. To permit station relocation in the illustrated example, an additional set of four electric thrusters would need to be added at the locations of the electric thrusters 22e-h in FIGS. 1 and 2. This would raise the total number of electric thrusters 22 to twelve. The inclination corrections and redundancy mode would thus be similar to as described above, with the added feature that the electric thrusters 22e-h in FIG. 4 can be used to perform two axes of momentum unloading such that if any of the electric thrusters become inoperable there will be no loss of mission. As also discussed above, the electric thrusters 22 can be angled such that in a contingency where the first group, for example, becomes inoperable for inclination corrections, a combination of top electric thrusters 22e and 22f (for the second group and added electric thrusters to get to the total of twelve) can be used to perform the inclination correction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A propulsion system for a spacecraft, the propulsion system comprising:
at least one group of electric thrusters spatially distributed in a multi-axis system; and
a controller in communication with each of the electric thrusters, the controller configured to differentially throttle thrusts of the electric thrusters with respect to propulsion force about two axes of the multi-axis system,
wherein the at least one group of electric thrusters includes a first group of electric thrusters and a second group of electric thrusters, and the controller includes a primary mode of operation in which the controller is configured to differentially throttle the thrusts of the first group in response to a first ascension angle and differentially throttle the thrusts of the second group for a predetermined time period in response to a second, different ascension angle, and
the controller includes a redundancy mode of operation triggered in response to an inoperability of at least one of the electric thrusters in the first group, and in the redundancy mode the controller is configured to differentially throttle a complimentary pair of the electric thrusters of the first group in which the thrust of the complimentary pair of the electric thrusters in non-primary off-axis directions cancels.

2. The propulsion system as recited in claim 1, wherein the controller is configured to differentially throttle the thrusts with respect to unloading accumulated angular momentum of momentum wheels about the two axes of the multi-axis system.

3. The propulsion system as recited in claim 1, wherein two or more of the electric thrusters are oriented in different directions.

4. The propulsion system as recited in claim 1, wherein, with respect to the multi-axis system, each of the electric thrusters is oriented at approximately 45°, or positive or negative multiples thereof, to each of three orthogonal axes.

5. The propulsion system as recited in claim 1, wherein the controller is configured to differentially throttle the thrusts of the first group with respect to the two axes of the multi-axis system and differentially throttle the thrusts of the second group with respect to a third axis of the multi-axis system.

6. The propulsion system as recited in claim 1, wherein the first group is symmetrically arranged with respect to the second group.

7. The propulsion system as recited in claim 1, wherein the propulsion system is gimbal-less.

8. The propulsion system as recited in claim 1, wherein the controller is configured to differentially throttle the thrusts in with simultaneous or overlapping firing.

9. A method for a propulsion system, the method comprising:
for at least one group of electric thrusters spatially distributed in a multi-axis system, differentially throttling thrusts provided by the electric thrusters with respect to propulsion force about two axes of the multi-axis system,
wherein the at least one group includes a first group of electric thrusters and a second group of electric thrusters, and, in a primary mode of operation, differentially throttling the thrusts of the first group in response to a first ascension angle and differentially throttling the thrusts of the second group for a predetermined time period in response to a second, different ascension angle, and triggering a redundancy mode of operation in response to an inoperability of at least one of the electric thrusters in the first group, and in the redundancy mode differentially throttling a complimentary pair of the electric thrusters of the first group in which the thrust of the complimentary pair of the electric thrusters in non-primary off-axis directions cancels.

10. The method as recited in claim 9, including differentially throttling the thrusts with respect to unloading accumulated angular momentum of momentum wheels about the two axes of the multi-axis system.

11. The method as recited in claim 9, including differentially throttling the thrusts of the first group with respect to the two axes of the multi-axis system and differentially throttling the thrusts of the second group with respect to a third axis of the multi-axis system.

12. The propulsion system as recited in claim 1, wherein the propulsion system is gimbal-less, and, with respect to the multi-axis system, each of the electric thrusters is oriented at approximately 45°, or positive or negative multiples thereof, to each of three orthogonal axes.

13. The propulsion system as recited in claim 12, wherein multiple pairs of the electric thrusters are oriented in different, complimentary directions such that thrust in non-primary off-axis directions cancels.

* * * * *